(12) United States Patent
Lin

(10) Patent No.: US 7,508,185 B2
(45) Date of Patent: Mar. 24, 2009

(54) SIMPLE ZERO CURRENT SWITCH CIRCUIT

(75) Inventor: Kuo-Fan Lin, No. 22, Jianguo E. Rd., Taoyuan City, Taiyuan Hsien (TW)

(73) Assignees: SPI Electronic Co., Ltd., Taoyuan Hsien (TW); Kuo-Fan Lin, Taoyuan Hsien (TW)

( * ) Notice: Subject to any disclaimer, the term of this patent is extended or adjusted under 35 U.S.C. 154(b) by 0 days.

(21) Appl. No.: 11/498,180

(22) Filed: Aug. 3, 2006

(65) Prior Publication Data
US 2008/0031016 A1  Feb. 7, 2008

(51) Int. Cl.
*H02H 7/12* (2006.01)
(52) U.S. Cl. .......................... 323/351; 323/282
(58) Field of Classification Search ............. 363/16, 363/89; 323/222, 282, 351
See application file for complete search history.

(56) References Cited

U.S. PATENT DOCUMENTS

| | | | | |
|---|---|---|---|---|
| 5,486,752 A | * | 1/1996 | Hua et al. | 323/222 |
| 5,726,872 A | * | 3/1998 | Vinciarelli et al. | 363/89 |
| 6,215,290 B1 | * | 4/2001 | Yang et al. | 323/282 |
| 6,385,056 B1 | * | 5/2002 | Gucyski | 363/15 |
| 6,518,739 B2 | * | 2/2003 | Wald et al. | 323/351 |
| 6,987,379 B2 | * | 1/2006 | Peron | 323/225 |
| 7,161,331 B2 | * | 1/2007 | Wai et al. | 323/222 |

FOREIGN PATENT DOCUMENTS

| TW | 279514 A | 6/1996 |
|---|---|---|
| TW | I223135 B | 11/2004 |

* cited by examiner

*Primary Examiner*—Adolf Berhane
(74) *Attorney, Agent, or Firm*—Muncy, Geissler, Olds & Lowe, PLLC (57) ABSTRACT

A simple zero current switch circuit includes a first coil set and a second coil set that are wound at a selected coil ratio and bridge electrically an energy storing inductor, an output diode and a conduction switch of a power-factor corrector. The leaking inductance of the first coil set generates a back electromotive force to make the conduction switch in a zero current switching condition. An energy conversion circuit is provided to store reverse energy according to the coil ratio of the second coil set and the first coil set and reclaims the energy to an output capacitor of the power-factor corrector while the output diode generates a reverse recovery condition. Thereby reverse recovery time of the output diode can be shortened.

6 Claims, 9 Drawing Sheets

SIMPLE ZERO CURRENT SWITCH CIRCUIT

FIELD OF THE INVENTION

The present invention relates to a simple zero current switch circuit and particularly to a zero current switch circuit that can generate reverse energy while a power-factor corrector is in a conversion condition and proceed energy storing and discharging processes to reutilize the reverse energy and reduce power switch energy loss.

BACKGROUND OF THE INVENTION

Reference techniques for the conventional zero current switch circuit of power-factor correctors used on the present exchange power supply can be found in R.O.C. patent publication Nos. 279514 and R.O.C. patent Nos. I223135. Those techniques mainly aim to reduce conduction switch switching loss of the power-factor correctors (zero switching loss is most preferable) and electromagnetic interference. No. 279514 includes an energy consumption circuit which consists of capacitors, inductors, saturated inductance and resistors to eliminate reverse recovery current and improve electric power factor and electricity utilization efficiency. No. 1223135 proposes an energy conversion circuit which includes an inductor, an energy storing capacitor and a plurality of diodes coupling with a saturated inductor to form a current circuit. It reclaims the reverse energy generated by the power-factor corrector in a reverse recovery condition at different time sequences, and proceeds energy storing and discharging processes to send the reverse energy to a power output end to be reutilized, thereby improves the operation efficiency of the power-factor corrector. However, there are still rooms for improvement in that technique, notably:

1. An inductor L3 has to be added that increases inductor magnetic loss compared with the single saturated inductor originally adopted. The cost is higher.
2. The amount of reverse energy being reclaimed depends on the inductor L3. In the design that involves a heavy loading or high capacity power supply, as the inductor L3 has a constant inductive reactance, the reverse recovery time of the output diode is longer compared with the light loading condition or a lower capacity power supply. As a result, more magnetic loss occurs.
3. The capability of the driving saturated inductor is determined by the amount of discharging current of resistor R1 to capacitor C3. As the discharging time has to be greater than the duty cycle, discharge current cannot be increased. As a result, saturation of the inductor L2 is incomplete, and the loss caused by the resistor R1 increases.

SUMMARY OF THE INVENTION

The primary object of the present invention is to solve the aforesaid disadvantages. The invention aims to provide a zero current switch circuit that has a first coil set and a second coil set of a selected coil ratio that electrically bridge an energy storing inductor, an output diode and a conduction switch of a power-factor corrector. The first coil set produces a leaking inductance to generate a back electromotive force to make the conduction switch in a zero current switching condition. An energy conversion circuit is provided to couple with the output diode to generate a reverse recovery condition. The reverse energy is stored according to the coil ratio of the second coil set relative to the first coil set and reclaimed to the output capacitor of the power-factor corrector, thus reverse recovery time of the output diode is shortened. Moreover, through input current flowing through the second coil set, the saturated inductor (first coil set) can reach a fully saturated condition. The resistance loss is lower. The zero current switch circuit thus formed is simply designed and provides a higher efficiency.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
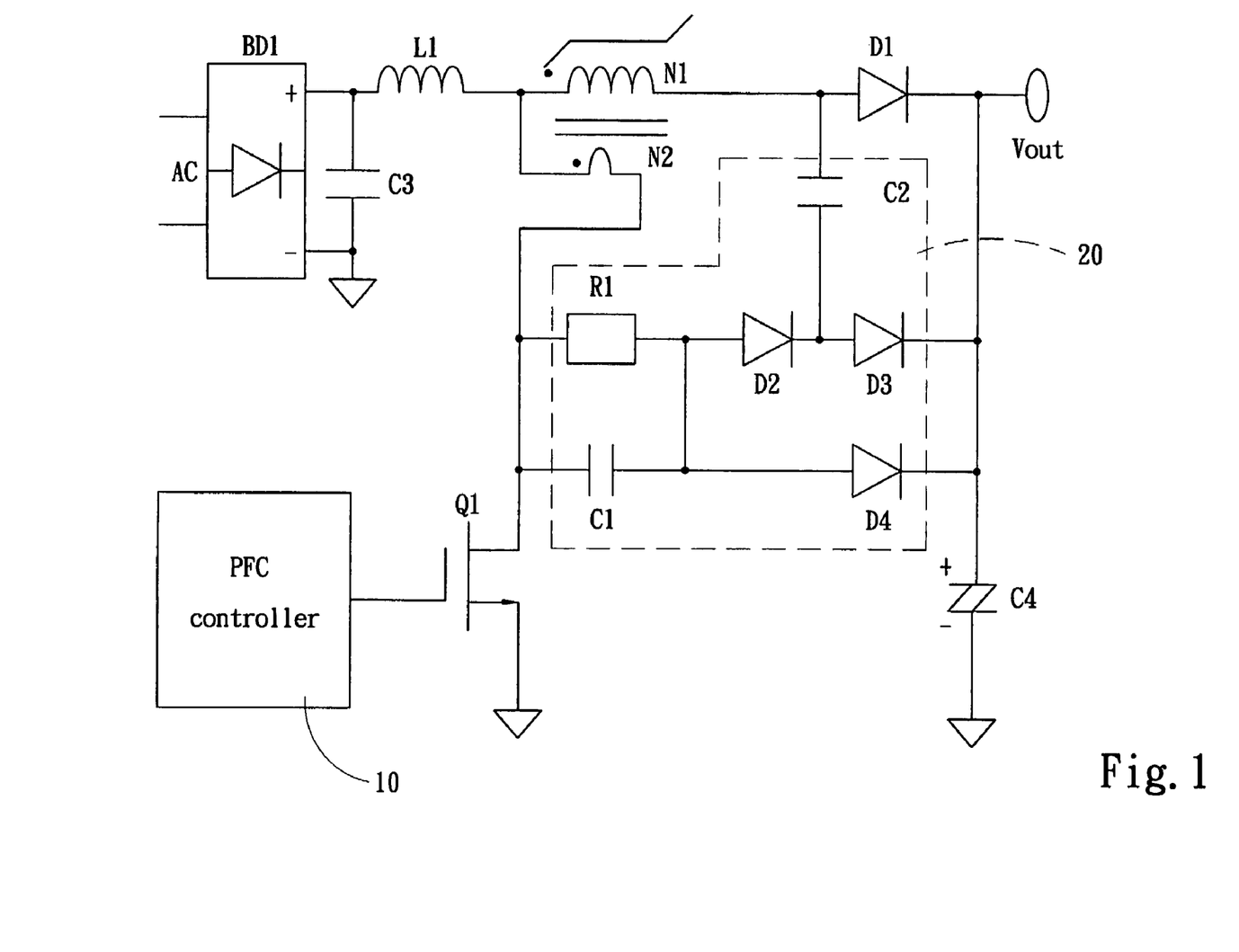
FIG. 1 is a circuit diagram of an embodiment of the invention.

Please refer to FIG. 1 for the circuit diagram of an embodiment of the invention. The simple zero current switch circuit according to the invention mainly aims to control a conduction switch Q1 of a power-factor corrector to be in a zero current condition during ON/OFF switching operations. The power-factor corrector includes an energy storing inductor L1 to receive commutated electric power and store energy and perform discharging, an output diode D1 and an output capacitor C4 electrically bridging the energy storing inductor L1 and a power output end Vout, and the conduction switch Q1 and a controller 10 electrically bridging the energy storing inductor L1 and the output diode D1. The zero current switch circuit includes a first coil set N1 bridging the energy storing inductor L1 and the output diode D1. The first coil set N1 is connected to the conduction switch Q1 through a second coil set N2 which is wound reversely according to a selected coil ratio relative to the first coil set N1. The first coil set N1 has a leaking inductance to generate a back electromotive force to make the conduction switch Q1 in a zero current switching condition during ON/OFF operations. And an energy conversion circuit 20 is provided to couple with the power-factor corrector, the first coil set N1 and the second coil set N2 to form a power circuit. The energy conversion circuit 20 includes a plurality of diodes D2, D3 and D4, and capacitors C1 and C2. When the output diode D1 generates a reverse recovery condition, the energy conversion circuit 20 stores the reverse energy according to the coil ratio of the second coil set N2 relative to the first coil set N1, and reclaims the energy to the output capacitor C4. Thereby the output diode D1 can shorten the reverse recovery time period.

Figure 2:
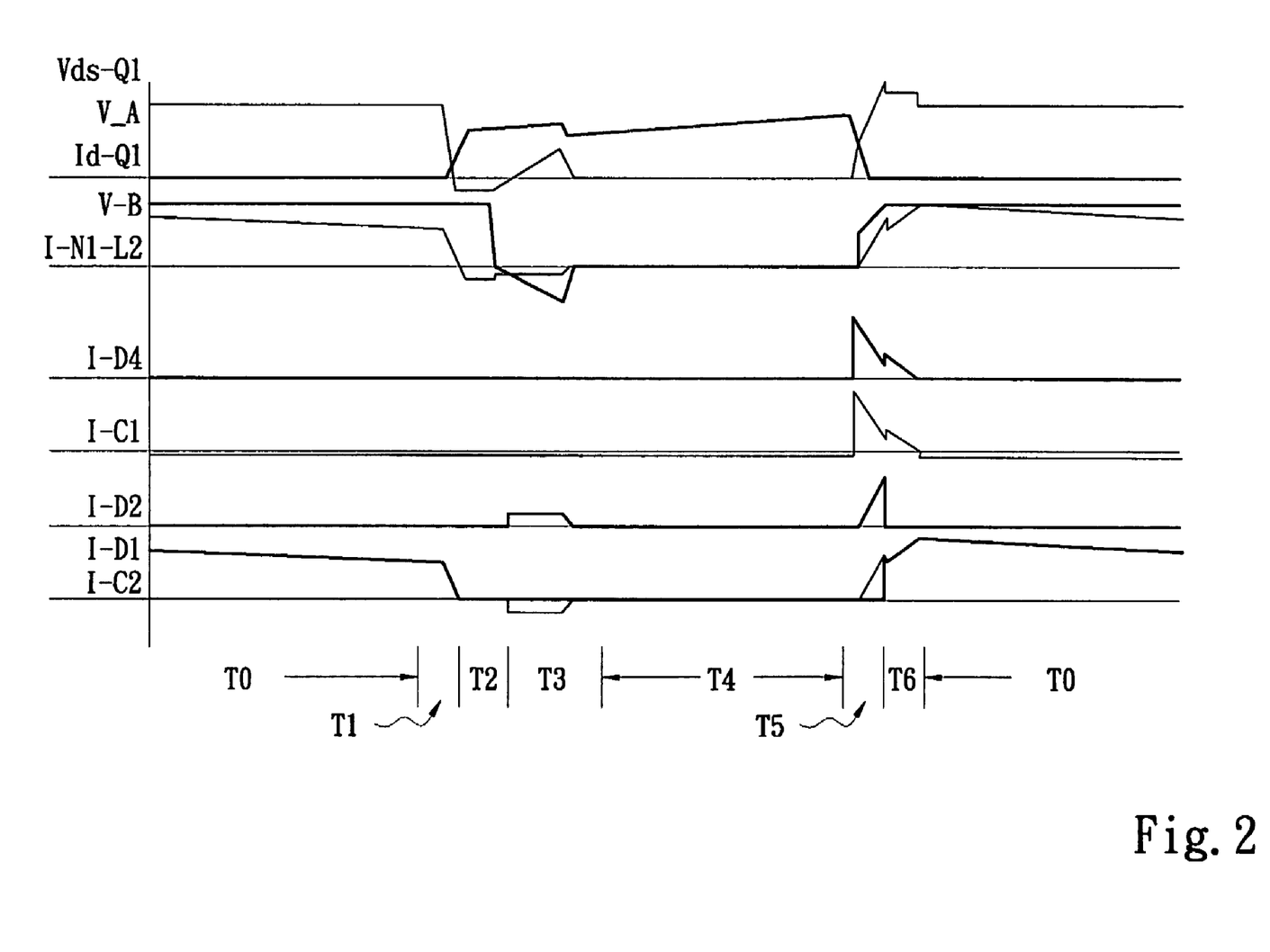
FIG. 2 is a schematic view of duty waveforms of the invention at different time sequences.
Figure 3:
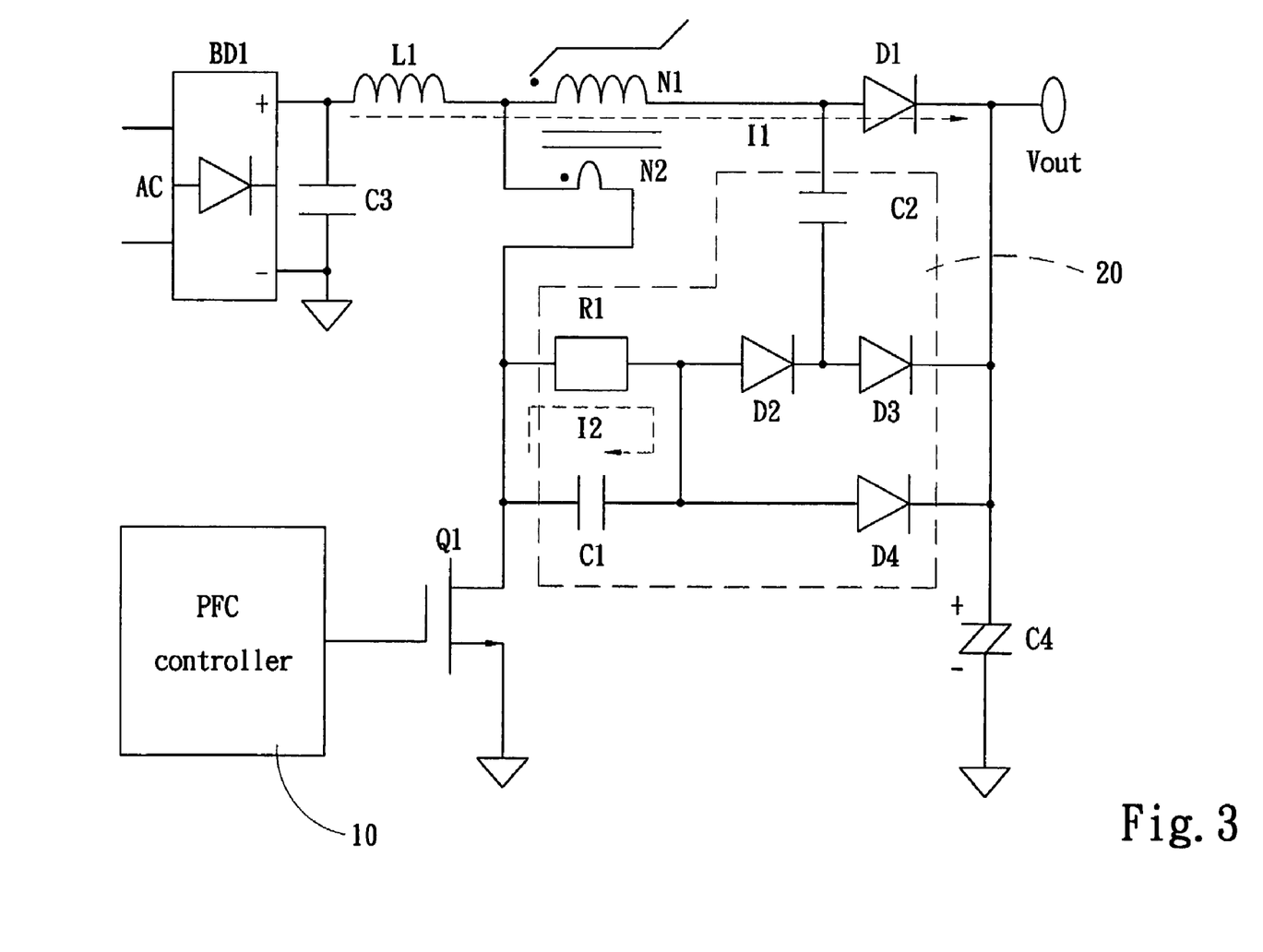
FIGS. 3 through 9 are current loop diagrams of the invention at different time sequences.

Refer to FIG. 2 for the current waveforms of various duty voltages at different time sequences based on which the operation principle of the embodiment circuit is discussed as follow:

At time sequence T0 (referring to FIG. 3): It is continued from a time sequence T6. At this time sequence, the duty voltage and current are in a stable condition; the capacitor C1 maintains an existing discharge circuit condition I2 that consumes power through a resistor R1 and provides a reverse bias to prohibit conduction between the diodes D2 and D4. The first coil set N1 is in a saturated condition and becomes short circuit. The conduction switch Q1 is not yet in an ON condition. Hence output energy I1 is provided from a front end rectifier to pass through the energy storing inductor L1, first coil set N1 and output diode D1 to the power output end Vout to supply required energy.

Figure 4:
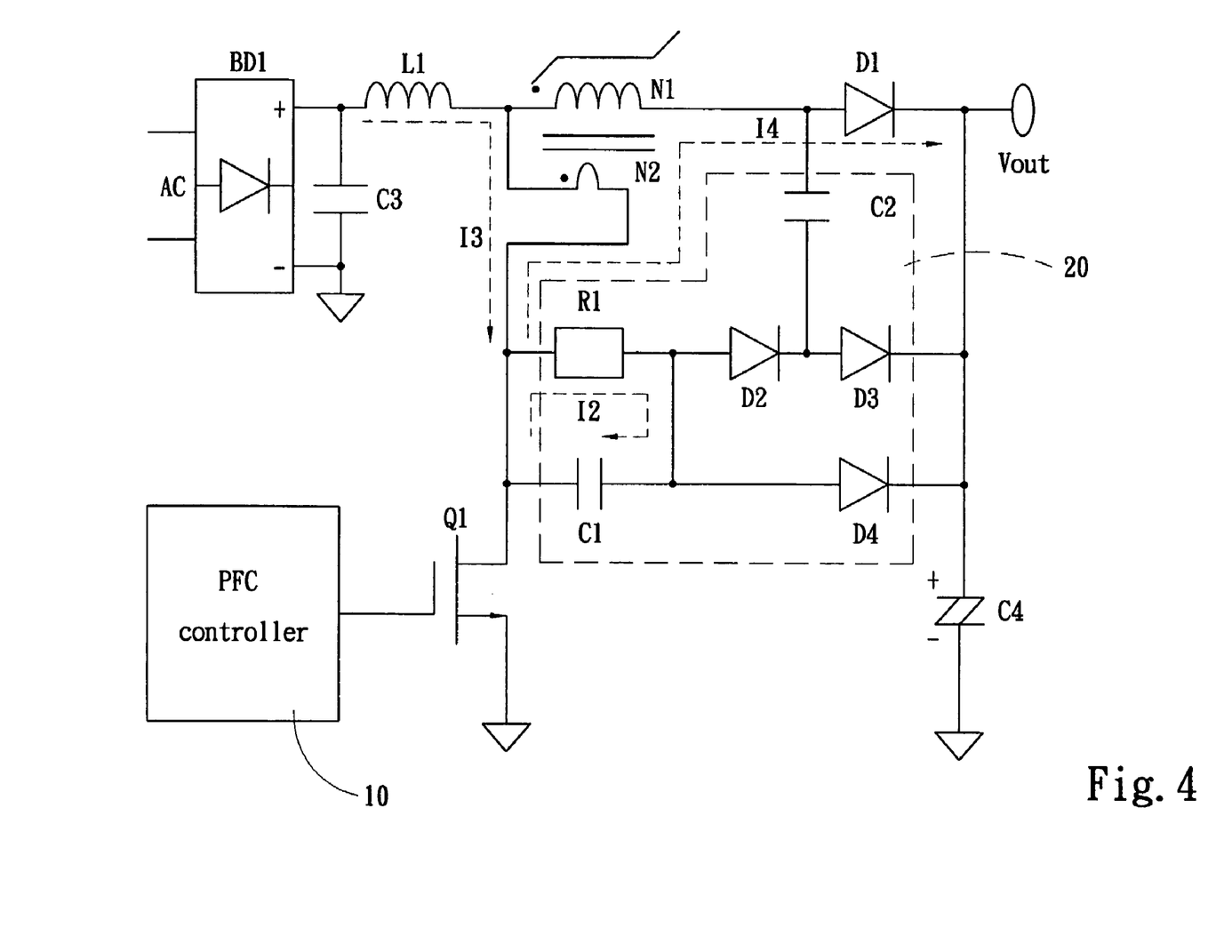

At time sequence T1 (referring to FIG. 4): The conduction switch Q1 is in an ON switching condition. At the instant of the ON condition, the saturated first coil set N1 starts discharging, current I2 flows in the original direction; through the back electromotive force of leaking inductance of the first coil set N1, a current I3 is generated by loading of the conduction switch Q1 that is opposite to current I4 and offset. Hence the conduction switch Q1 is in the zero current switching condition at the instant of ON condition. As a result, no switching loss occurs to the conduction switch Q1, and electromagnetic interference can be prevented.

Figure 5:
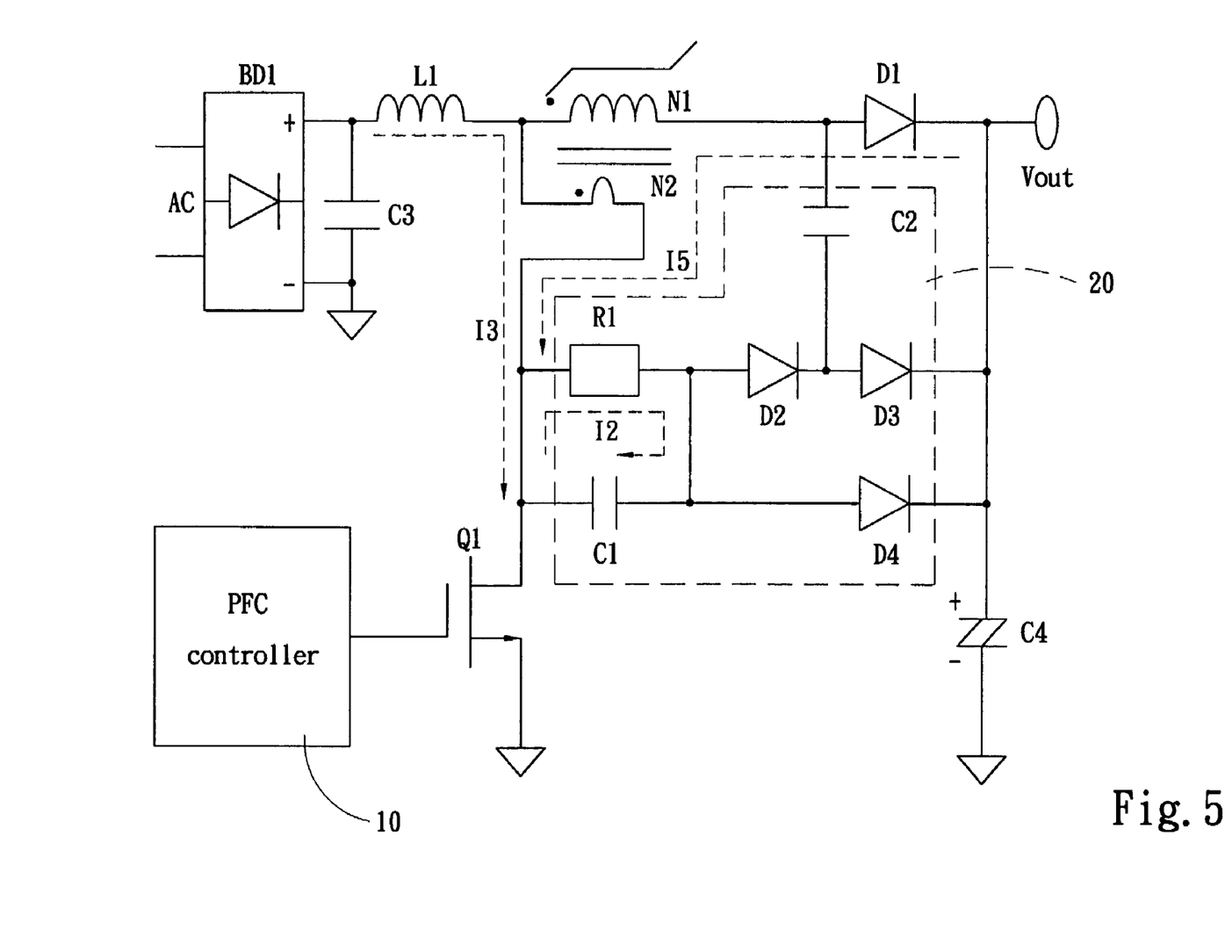

At time sequence T2 (referring to FIG. 5): The conduction switch Q1 is in the ON condition, a reverse recovery current I5 flows through the first coil set N1 and second coil set N2 to a ground end, and discharges to the output diode D1 according the ratio of I5=I3×(N1/N2−1); meanwhile the reverse recovery energy is stored in the energy storing inductor L1.

Figure 6:
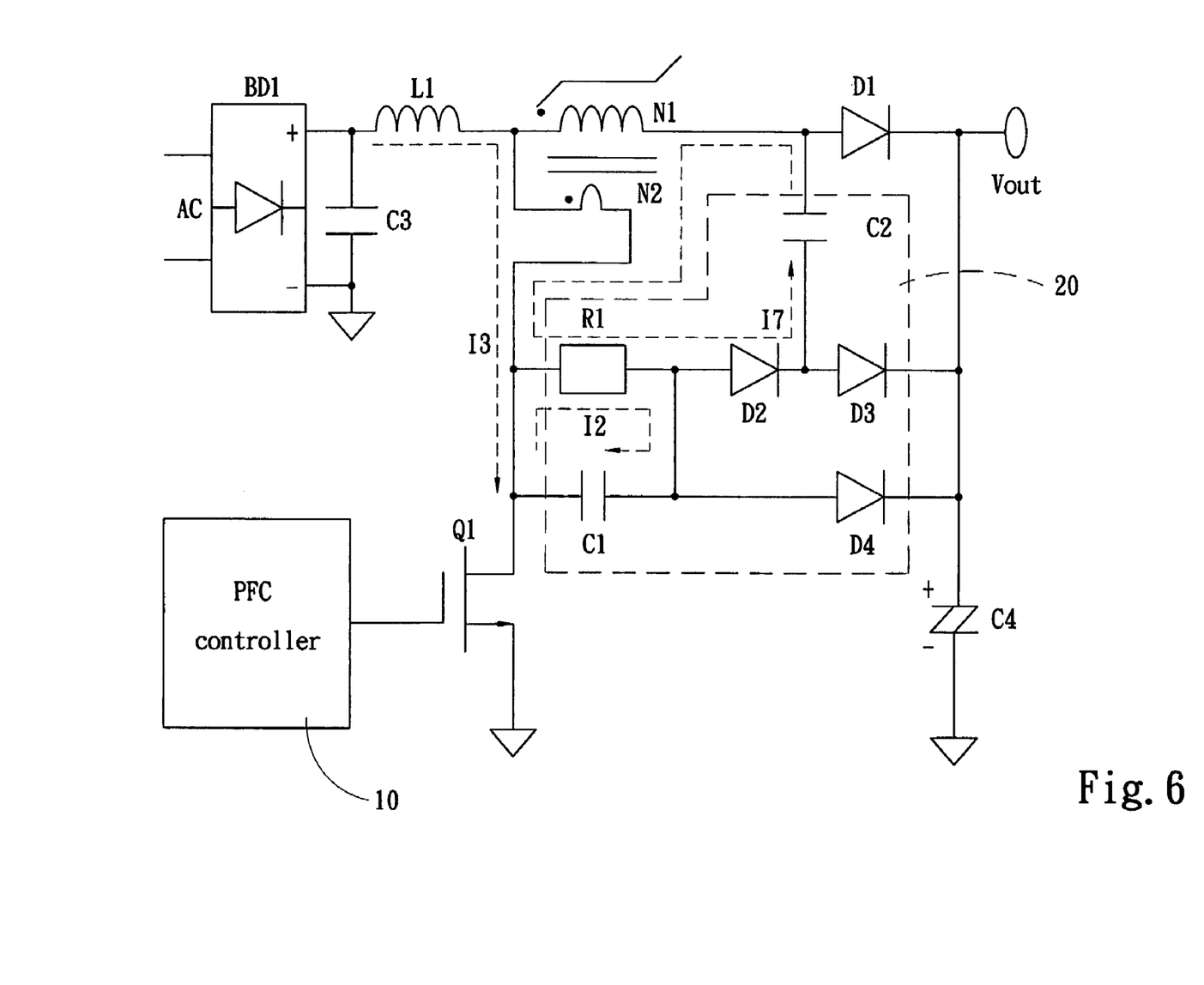

At time sequence T3 (referring to FIG. 6): The reverse energy of the output diode D1 has been released, the reverse recovery energy previously stored in the energy storing inductor L1 discharges to the capacitor C2 through the resistor R1 and diode D2 (marked by a reverse current I7). It is to be noted that the reverse current I7 is generated according to the ratio of I5=I3×(N1/N2−1). This action transfers the reverse energy from the energy storing inductor L1 to the capacitor C2 until the current I7 becomes zero.

At time sequence T4 (referring to FIG. 7): This is a stable conduction period. The output diode D1 is in the reverse recovery condition. Current I3 flows through the second coil set N2 to maintain the saturated inductor in a fully saturated condition.

Figure 8:
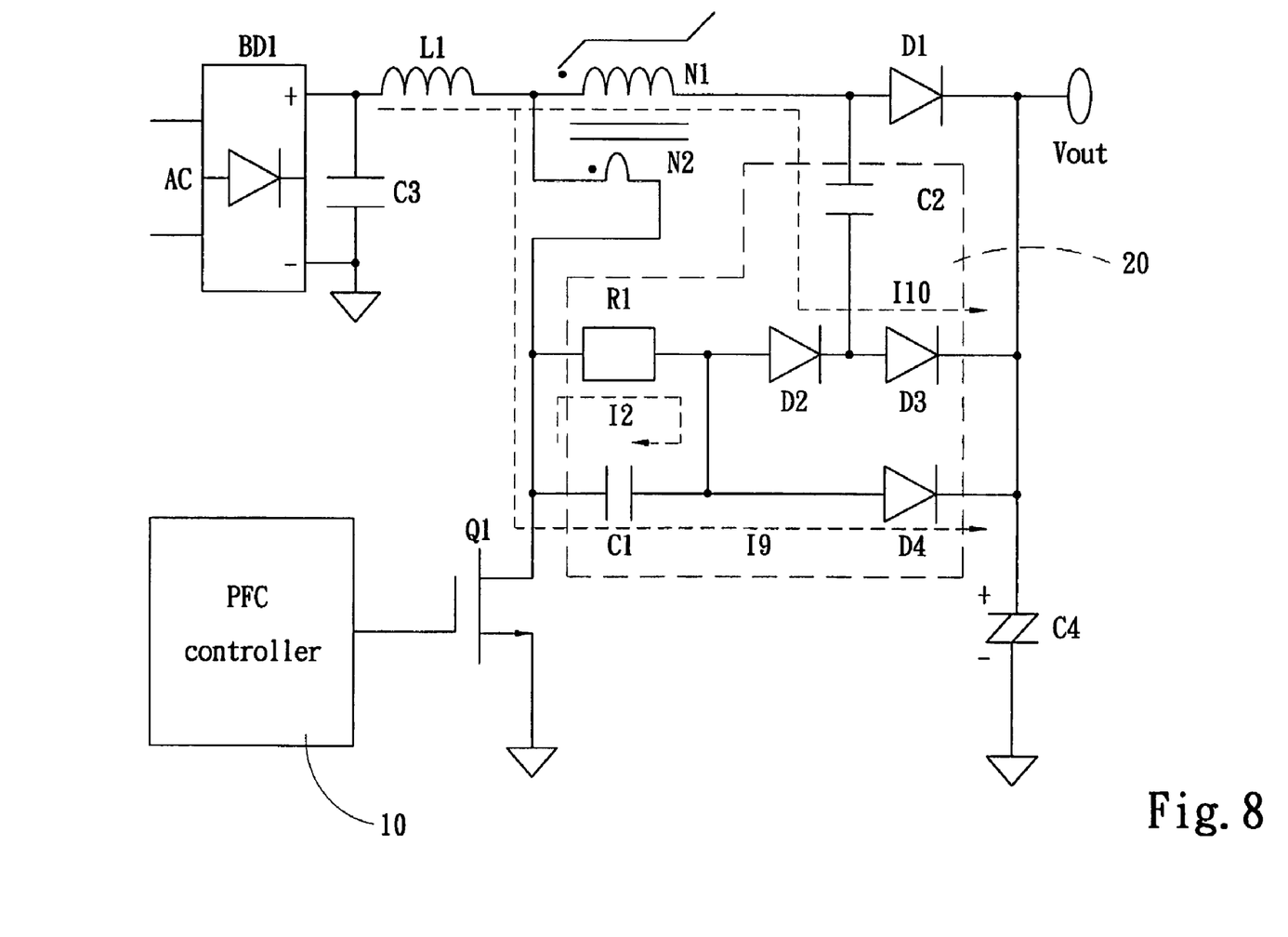

At time sequence T5 (referring to FIG. 8): The conduction switch Q1 is switched to an OFF condition. First, electricity of the capacitor C2 reclaims the original storing energy to the power output end Vout through the first coil set N1, capacitor C2 and diode D3, meanwhile a current I10 is generated to defer rising speed of voltage to reduce switching loss while the conduction switch Q1 is turned OFF. The stable time of leaking inductance of the second coil set N2 also is shortened. Then the voltage Vds of the conduction switch Q1 is higher than the power output end Vout to make the capacitor C1 and diode D4 in the circuit to become conductive to generate a current I9 to harness the voltage Vds of the conductive switch Q1 from rising continuously until the leaking inductance current of the first coil set N1 is stabilized.

Figure 9:
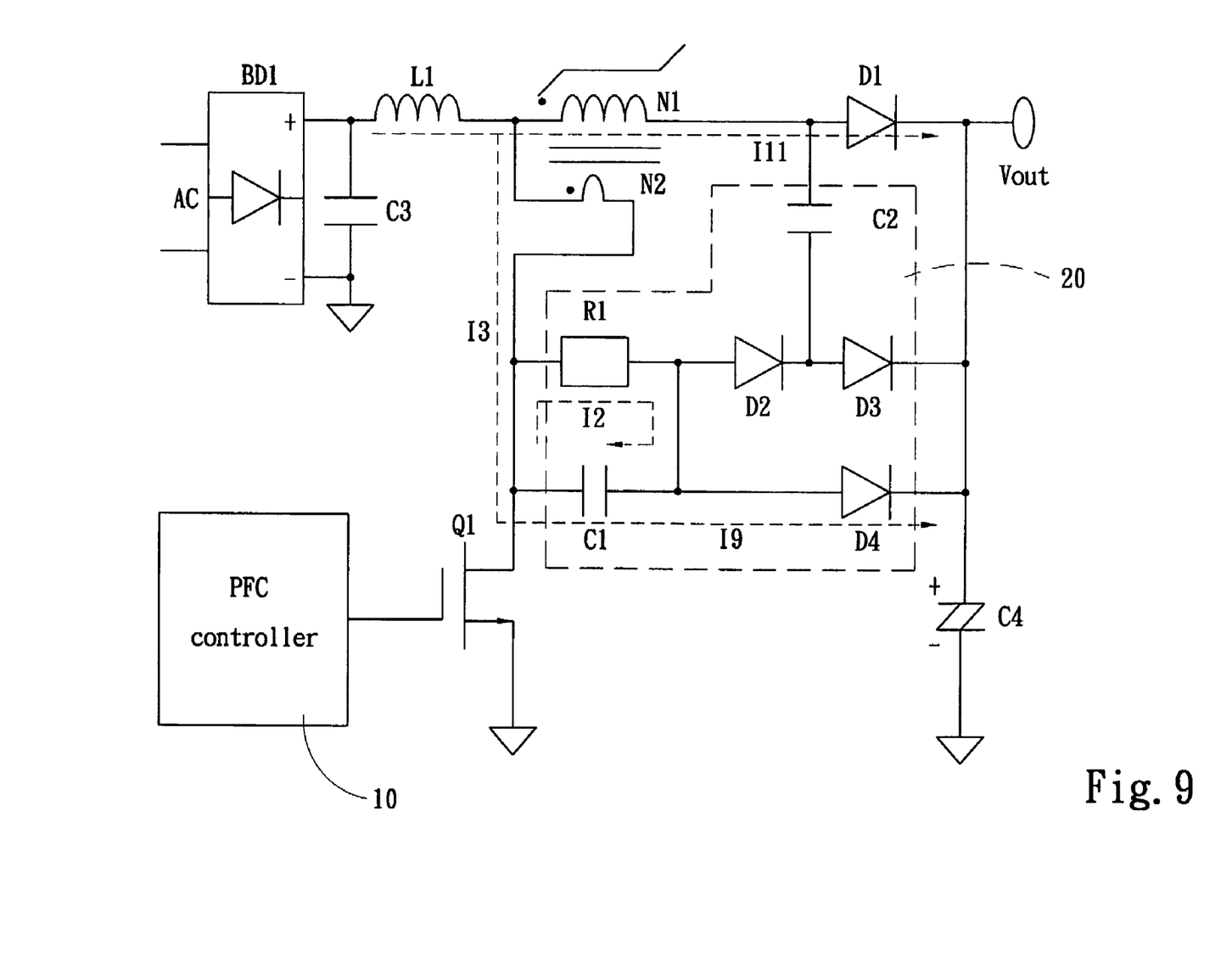

At time sequence T6 (referring to FIG. 9): The reverse energy of the original storing energy in the capacitor C2 is fully released and reclaimed to the output capacitor C4 to be reutilized. The potential difference of the capacitor C2 is zero. Hence the diode D3 is in an OFF condition. The output diode D1 is ON due to forward bias. Current I11 flows to the power output end Vout through the first coil set N1 and output diode D1. Meanwhile, the potential of the capacitor C1 is higher than the power output end Vout due to the conduction switch Q1 on the left side is OFF. Hence current I9 is ON due to the forward bias of the diode D4. Current I9 flows to the power output end Vout through the second coil set N2, capacitor C1 and diode D4 to charge the capacitor C1. Current I11 rises according to a positive inclination ratio of the voltage of the capacitor C1 against the leaking inductance of the first coil set N1, while current I9 drops according to a negative inclination ratio until the current I9 becomes zero. Finally return to time sequence T0 and repeat the processes previously discussed.

Figure 7:
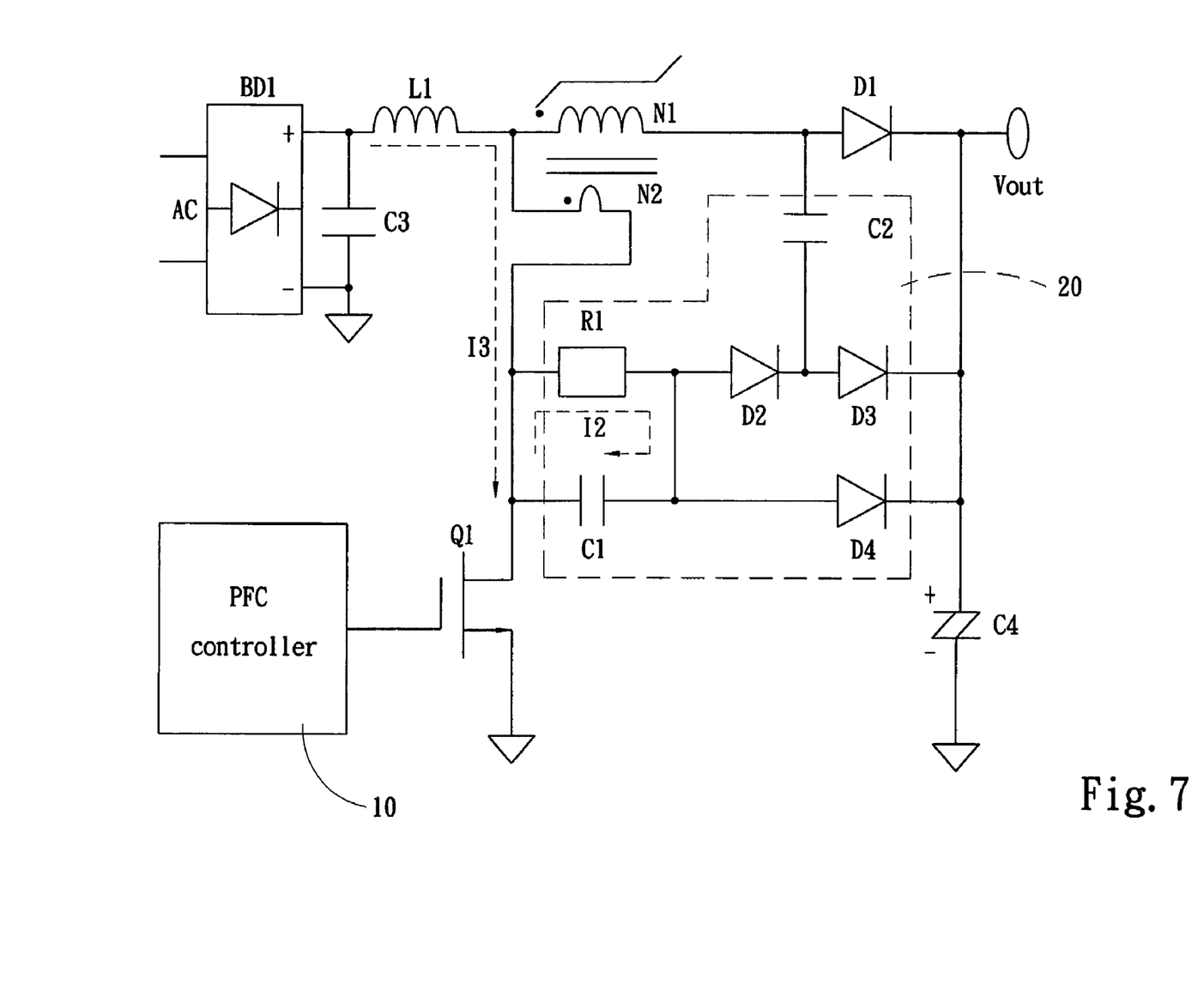

Based on previous discussion, the second coil set N2 is reversely wounded according to a coil ratio relative to the first coil set N1 and electrically connected to the energy conversion circuit 20. It employs a single saturated inductor, thus does not have magnetic loss and copper loss of another inductor (occurred to No. 1223135). Moreover, the reverse energy is determined by the coil ratio of the first coil set N1 and second coil set N2. Hence whatever the condition of the power output end Vout, a consistent and shorter reverse recovery time can be maintained for the output diode D1. In addition, reclaiming the reverse energy is accomplished according to the coil ratio. The first coil set N1 can be straddled by a lower voltage second (V*T). Hence magnetic loss of the saturated inductor (the first coil set N1) is lower. Furthermore, at time sequence T4, current I3 passing through the second coil set N2 keeps the saturated inductor (the first coil set N1) in a fully saturated condition all the time. This can shorten the time of the current passing through the capacitor C1. As a result, loss caused by the resistor R1 is reduced. Thus the invention is more suitable for the design of a higher power supply.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A simple zero current switch circuit to control a conduction switch of a power-factor corrector in a zero current condition during ON/OFF switching operations, the power-factor corrector including an energy storing inductor to receive a commutated electric power and store energy and perform discharging, an output diode and an output capacitor electrically bridging the energy storing inductor and a power output end, and a conduction switch and a controller electrically bridging the energy storing inductor and the output diode, the zero current switch circuit comprising:

a first coil set bridging the energy storing inductor and the output diode, the first coil set being connected to the conduction switch through a second coil set which is wound reversely according to a selected coil ratio relative to the first coil set, the first coil set having a leaking inductance to generate a back electromotive force to make the conduction switch in a zero current switching condition during ON/OFF operations; and an energy conversion circuit which is coupled with the power-factor corrector, the first coil set and the second coil set to form a power circuit, the energy conversion circuit including a plurality of diodes, capacitors, and a resistor; while the output diode generating a reverse recovery condition, the energy conversion circuit stores reverse energy according to the coil ratio of the second coil set relative to the first coil set and reclaims the energy to the output capacitor, discharge of said reverse energy being determined by said coil ratio to increase a speed of output diode discharge, an amount of current of the discharge is determined by the coil ratio so that said inductor is maintained in a saturated condition, thereby reverse recovery time of the output diode is shortened.

2. The simple zero current switch circuit of claim 1, wherein the first coil set and the second coil set are wound in reverse directions.

3. The simple zero current switch circuit of claim 1, wherein said first coil set has a first end and a second end, said first end being connected jointly to said energy storing inductor and a first end of said second coil set, said second end of said first coil set being connected to said output diode.

4. The simple zero current switch circuit of claim 3, wherein said second coil set has a second end connected directly to a terminal of said conduction switch.

5. The simple zero current switch circuit of claim 4, wherein said energy conversion circuit includes a first capacitor and a first resistor, a first end of said first capacitor and said first resistor connected directly to said terminal of said conduction switch and said second end of said second coil, a second end of said first capacitor and said first resistor being connected together.

6. The simple zero current switch circuit of claim 5, wherein said second end of said first capacitor and said first resistor are jointly connected to a first end of at least one of said plurality of diodes.

* * * * *